United States Patent
Ushida et al.

(10) Patent No.: US 10,067,345 B2
(45) Date of Patent: Sep. 4, 2018

(54) HEAD-UP DISPLAY DEVICE

(71) Applicant: NIPPON SEIKI CO., LTD., Niigata (JP)

(72) Inventors: Norihiko Ushida, Niigata (JP); Yoshiyuki Okamoto, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/533,119

(22) PCT Filed: Dec. 4, 2015

(86) PCT No.: PCT/JP2015/084136
§ 371 (c)(1),
(2) Date: Jun. 5, 2017

(87) PCT Pub. No.: WO2016/093163
PCT Pub. Date: Jun. 16, 2016

(65) Prior Publication Data
US 2017/0336632 A1 Nov. 23, 2017

(30) Foreign Application Priority Data
Dec. 9, 2014 (JP) .................... 2014-249037

(51) Int. Cl.
*G02B 26/08* (2006.01)
*G02B 27/01* (2006.01)
*B60K 35/00* (2006.01)

(52) U.S. Cl.
CPC ........ *G02B 27/0149* (2013.01); *B60K 35/00* (2013.01); *G02B 27/0101* (2013.01);
(Continued)

(58) Field of Classification Search
CPC ............ G02B 27/0149; G02B 27/0101; G02B 2027/0159; G02B 2027/0161;
(Continued)

(56) References Cited

U.S. PATENT DOCUMENTS 8,864,325 B2 * 10/2014 Maruyama ......... G02B 27/0149
359/871
2011/0061482 A1 3/2011 Maruyama et al.
2013/0313298 A1 11/2013 Leist et al.

FOREIGN PATENT DOCUMENTS

JP H08-175224 A 7/1996
JP 2009-073461 A 4/2009
(Continued)

OTHER PUBLICATIONS

International Search Report issued in Application No. PCT/JP2015/084136 dated Feb. 23, 2016, with English Translation.

*Primary Examiner* — Euncha Cherry
(74) *Attorney, Agent, or Firm* — McDermott Will & Emery LLP (57) ABSTRACT

The present invention addresses the problem of providing a head-up display device with which the display quality of a display object can be improved. A mirror holder 30 supporting a concave mirror is equipped with a protruding piece that protrudes from the approximate center of the holder width, which is defined along a rotational axis, and this protruding piece is moved by a position adjustment means. Stress acting on the mirror holder from the protruding piece is uniform in the left and right directions from the center of the mirror holder. Consequently, twisting at the location of the mirror holder is significantly reduced, so the driver is able to view a display object for which distortion has been suppressed, and the display quality of the display object is improved.

4 Claims, 7 Drawing Sheets

(52) U.S. Cl.
CPC .......... *B60K 2350/2052* (2013.01); *B60K 2350/2056* (2013.01); *G02B 2027/0159* (2013.01); *G02B 2027/0161* (2013.01)

(58) Field of Classification Search
CPC .......... G02B 27/01; B60K 35/00; B60K 2350/2052; B60K 2350/2056
USPC .......... 359/221.3
See application file for complete search history.

(56) References Cited

FOREIGN PATENT DOCUMENTS

| | | | |
|---|---|---|---|
| JP | 2009-281557 | A | 12/2009 |
| JP | 2010-230157 | A | 10/2010 |
| JP | 2012-133244 | A | 7/2012 |
| JP | 2014-500170 | A | 1/2014 |

\* cited by examiner

HEAD-UP DISPLAY DEVICE

RELATED APPLICATIONS

This application is the U.S. National Phase under 35 U.S.C. § 371 of International Application No. PCT/JP2015/084136, filed on Dec. 4, 2015, which in turn claims the benefit of Japanese Application No. 2014-249037, filed on Dec. 9, 2014, the disclosures of which are incorporated by reference herein.

TECHNICAL FIELD

The present invention relates to a head-up display device incorporating a concave mirror capable of tilting.

BACKGROUND ART

A driver of a vehicle gazes at the front through a windshield, and performs driving while visually checking instruments on an instrument panel. That is, a line of sight moves to the front and lower instruments. If a driver can see instruments while looking at the front, there is no movement of the line of sight, and improvement of drivability can be expected. From this finding, a head-up display device has been developed and put to practical use (see, for example, Patent Literature 1).

As shown in FIG. 1 of Patent Literature 1, (the numerals in parentheses indicate the reference number described in Patent Literature 1, the same applies hereinafter), display light (L) is irradiated on the windshield (13) from the display device (12). The driver (14) seated in the driver's seat of the vehicle can visually recognize the display image (V) obtained by this irradiation through the windshield (13).

When the driver (14) replaces, the height of the eyes changes based on the physical difference (sitting height difference). A technique for changing the position of the display light (L) to cope with this change is disclosed in Patent Literature 1.

That is, the display device (12) shown in FIG. 2 of Patent Literature 1 includes a second reflector (40) capable of adjusting the emission angle of display light (L).

One form of the second reflector (40) is shown in FIG. 8 of Patent Literature 1. It comprises a concave mirror (41) for reflecting the display light and a resin mirror holder (60) for holding the concave mirror (41). In FIG. 8, on the side portion (61) of the mirror holder (60) positioned on the left side, there is provided a first shaft portion (62) for attaching the mirror holder (60) to the attached portion (54 a) of the boss portion (54) provided in the housing (50). The first shaft portion (62) is provided with a stress absorbing portion for absorbing a stress acting on the first shaft portion (62) when the first shaft portion (62) is attached to the attached portion (54 a).

Furthermore, an output gear (42 c) is fixed to the tip of the drive shaft (42 b) of the stepping motor (42 a) as an actuator, and a gear portion (63 a) is integrally formed on the distal end side of the second shaft portion (63) to mesh with the output gear (42 c). Here, the second shaft portion (63) is provided on the side portion (61) of the mirror holder (60) positioned on the right side in FIG. 8.

Then, when the stepping motor (42 a) is rotated in a state, in which the concave mirror (41) is attached to the housing (50) (that is, the first shaft portion (62) is bearing-held by the concave attached portion (54 a), the driving force of the stepping motor (42 a) is transmitted to the gear part (reference 48 a in FIG. 5 of Patent Literature 1) via the output gear (42 c). As the power (driving force) is transmitted to the gear portion (48 a), the gear portion (48 a) rotates about the rotation axis (reference symbol RA in FIG. 5 of Patent Literature 1), and the mirror holder (60) and the concave mirror (41) held by the holder (60) rotates (tilts) by a predetermined angle about the rotation axis (RA).

As described above, it is possible to change the position of the display light in accordance with the change in the height of the eyes of the driver.

However, when the mirror holder (60) and the concave mirror (41) rotate by receiving the driving force from the stepping motor (42 a), the first shaft portion (62) is bearing-held by the attached portion (54 a), and it is conceivable that stress concentrates on the mirror holder (60) located near the second shaft portion (63). This phenomenon can also occur even when the mirror holder (60) is made of a relatively hard resin. Further, this phenomenon can occur irrespective of the presence or absence of the stress absorbing portion (62 a).

As a result, twist (deformation) occurs in the mirror holder (60) located near the second shaft portion (63).

Also, from another point of view, a resistance force (resistance torque) due to friction is inevitably generated between the attached portion (54 a) and the first shaft portion (62). When the second shaft portion (63) located furthest from the attached part (54 a) is rotated by the stepping motor (42 a), the rotation angle of the second shaft portion (63) far from the attached portion (54 a) increases with respect to the first shaft portion (62) receiving the resistance. As a result, twist (deformation) occurs in the mirror holder (60) located near the second shaft portion (63).

With the occurrence of the twist (deformation), there is a problem that the display image (V) visually recognized by the driver (14) through the windshield (13) is distorted and the display quality of the display image (V) is impaired. There remains room for further improvement on this point.

CITATION LIST

Patent Literature

Patent Literature 1: Japanese Unexamined Patent Application Publication No. 2012-133244

SUMMARY OF THE INVENTION

Problems to be Solved by the Invention

It is an object of the present invention to provide a head-up display device capable of improving the display quality of a display image visually recognized by a driver in order to cope with the above-mentioned problem.

Means for Solving the Problem

The invention according to claim 1 has the following features: a head-up display device, comprising a housing, a reflection mirror housed in the housing and reflecting display light from a display unit, a mirror holder housed in the housing and rotatably mounted on the housing for supporting the reflection mirror, a position adjusting means housed in the housing and adjusting the position of the mirror holder to adjust the angle of the reflection mirror, irradiating the display light reflected by the reflection mirror onto a projection member, and allowing a driver to visually recognize the display image obtained by the irradiation, and wherein the mirror holder comprise a protruding piece protruding from substantially the center of a holder width defined along a rotation axis, and the protruding piece is moved by the position adjusting means.

The invention according to claim 2 has the following features: the mirror holder is supported by the housing via a mounting member, a first shaft portion and a second shaft portion are respectively extended from both ends of the mirror holder along the rotation axis, and a first tubular bearing for rotatably supporting the first shaft portion and a second tubular bearing for rotatably supporting the second shaft portion are provided on the mounting member, a concave portion having a V-shaped cross section is formed at the bottom of the first tubular bearing, a steel ball is placed in the concave portion, a biasing member for biasing the second shaft portion toward the steel ball side is placed between the second tubular bearing and the second shaft portion, and in a direction along the rotation axis, the steel ball butts to the first tubular bearing, and the first shaft portion butts to the steel ball.

The invention according to claim 3 has the following features: the position adjusting means comprises a feed screw extending in a direction perpendicular to the rotation axis, a stepping motor for turning the feed screw, and a moving member including a first wall and a second wall which are sent by the feed screw to sandwich the protruding piece, and wherein a first leaf spring is interposed between the first wall and the protruding piece, a second leaf spring is interposed between the second wall and the protruding piece, and the protruding piece is always biased with the first and second leaf springs.

Effect of the Invention

In the invention according to claim 1, the stress acting on the mirror holder from the protruding piece when operating the position adjusting means is equalized in the lateral direction from the center of the mirror holder. The present invention does not concern the possibility of locally concentrating stress on a part of the mirror holder (mirror holder portion located near the second shaft portion) as in the conventional case. As a result, the twist (deformation) at the mirror holder portion is greatly suppressed, and accordingly, the driver can visually recognize the display image in which the distortion is suppressed, and there is an advantage that the display quality of the display image is improved.

In the invention according to claim 2, the first shaft portion and the steel ball contact each other at one point. In this way, the first shaft portion and the steel ball contact each other at one point, and the contact area becomes extremely small. As a result, abrasion of the first shaft portion that is in contact with the steel ball formed of the metal material at one point is suppressed, and there is an advantage that the durability of the first shaft portion can be improved.

In the invention according to claim 3, the protruding piece extending from the mirror holder is not just sandwiched between the first wall and the second wall, but is biased by the first and second leaf springs. Even if the inclination of the protruding piece is changed, no gap is formed between the protruding piece and the first and second leaf springs, and an axial force (a force for rotating the mirror holder about the rotation axis) is transmitted from the moving member to the protruding piece via the first and second walls and the first and second leaf springs. As a result, there is no worry that the mirror holder rattles, and occurrence of image blur of the display image can be suppressed.

MODE FOR CARRYING OUT THE INVENTION

Embodiments of the present invention will be described below with reference to the accompanying drawings. The drawings are to be seen in the sign direction.

Embodiments

Figure 1:
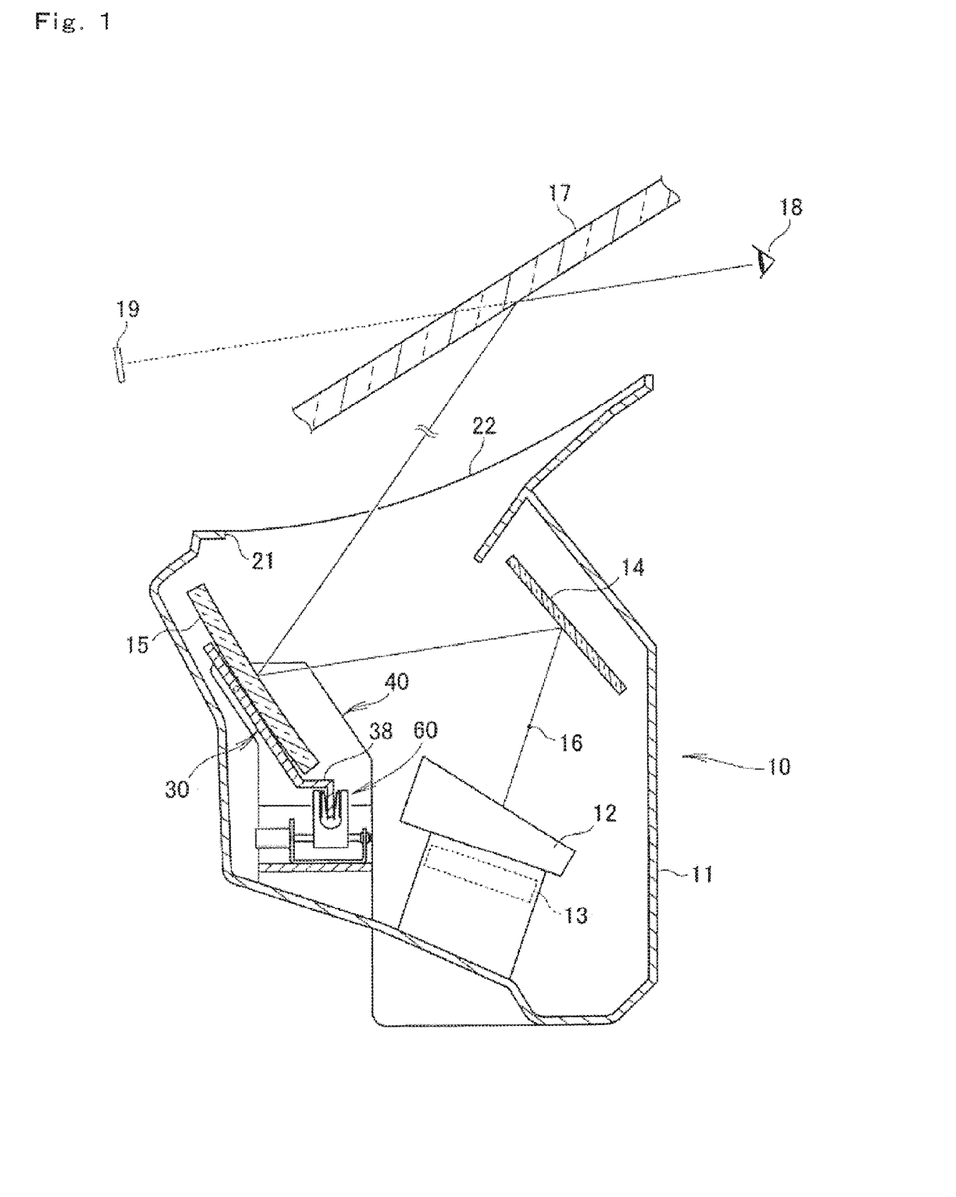
FIG. 1 is a cross-sectional view of a head-up display device according to the present invention.

As shown in FIG. 1, the head-up display device 10 is mounted on a vehicle such as an automobile. The head-up display device comprises a housing 11, a display unit 12 and a backlight unit 13 housed in the housing 11, a plane mirror 14 and a concave mirror (reflection mirror) 15 housed in the housing 11, and a position adjusting means 60 housed in the housing 11 for adjusting the tilt angle of the concave mirror 15. The reflection mirror 15 may be not only a concave mirror, but also a plane mirror and other reflecting mirrors, and may be of any type and form.

The display unit 12 receives the light from the backlight unit 13, and generates display light 16. The generated display light 16 is reflected by the plane mirror 14, and the reflected light is reflected by the concave mirror 15.

That is, the display light 16, generated through the display unit 12 and the backlight unit 13 and reflected by the plane mirror 14 and the concave mirror 15, is irradiated onto a windshield (projection member) 17 of a vehicle. A driver (user of the vehicle) 18 sitting in the driver's seat of the vehicle visually recognizes a display image 19 obtained by this irradiation through the windshield 17. The contents of the display image 19 are, for example, various vehicle information and navigation information.

The windshield 17 is an example of the projection member, but the projection member may be any member as long as it can project (irradiate) the display light 16, such as a reflector. The type and form of the projection member is not limited.

The housing 11 is, for example, a black resin molded product, and accommodates the display unit 12, the backlight unit 13, the plane mirror 14, the concave mirror 15, and the position adjusting means 60, and has an opening 21 through which the display light 16 passes, and a translucent cover 22 that covers the opening 21 on a surface facing the windshield 17.

Figure 2:
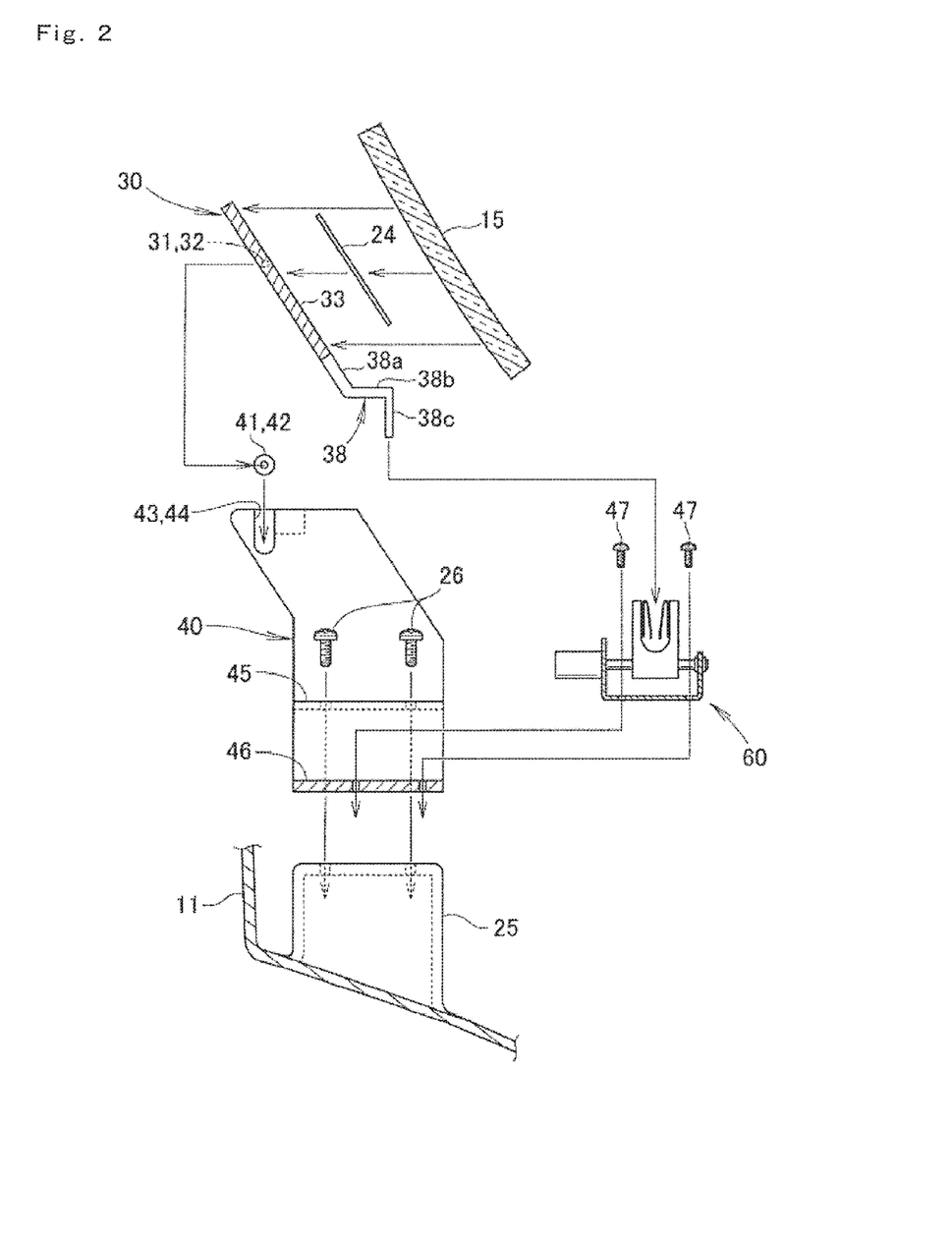
FIG. 2 is an exploded view of a main part of a head-up display device.

As shown in FIG. 2, the concave mirror 15 is attached to a mirror holder 30 via an adhesive layer 24 such as a double-sided adhesive tape.

Although the detailed shape of the mirror holder 30 will be described later, the mirror holder 30 is provided with a first shaft portion 31 and a second shaft portion 32, and supported by a stay (mounting member) 40 via a first tubular bearing 41 and a second tubular bearing 42. The stay 40 is provided with first and second U-shaped recessed portions 43, 44 into which the first and second tubular bearings 41, 42 can be inserted from above. Besides the stay, the mounting member 40 may be a bracket, and its type and form are arbitrary.

Although the detailed shape of the stay 40 will be described later, it has an upper stage floor portion 45 and a lower stage floor portion 46 descending from this upper stage floor portion 45. The position adjusting means 60 can be fixed to the lower floor portion 46 with screws 47, 47. The height difference between the upper stage floor portion 45 and the lower stage floor portion 46 is determined in consideration of the height of the position adjusting means 60. Preferably the height difference between the upper stage floor portion 45 and the lower stage floor portion 46 is made substantially equal to the height of the position adjusting means 60.

In addition, a base portion 25 having a U-shaped cross section is integrally formed on the bottom of the housing 11, and a stay 40 is fixed to the base portion 25 with screws 26, 26.

Figure 3:
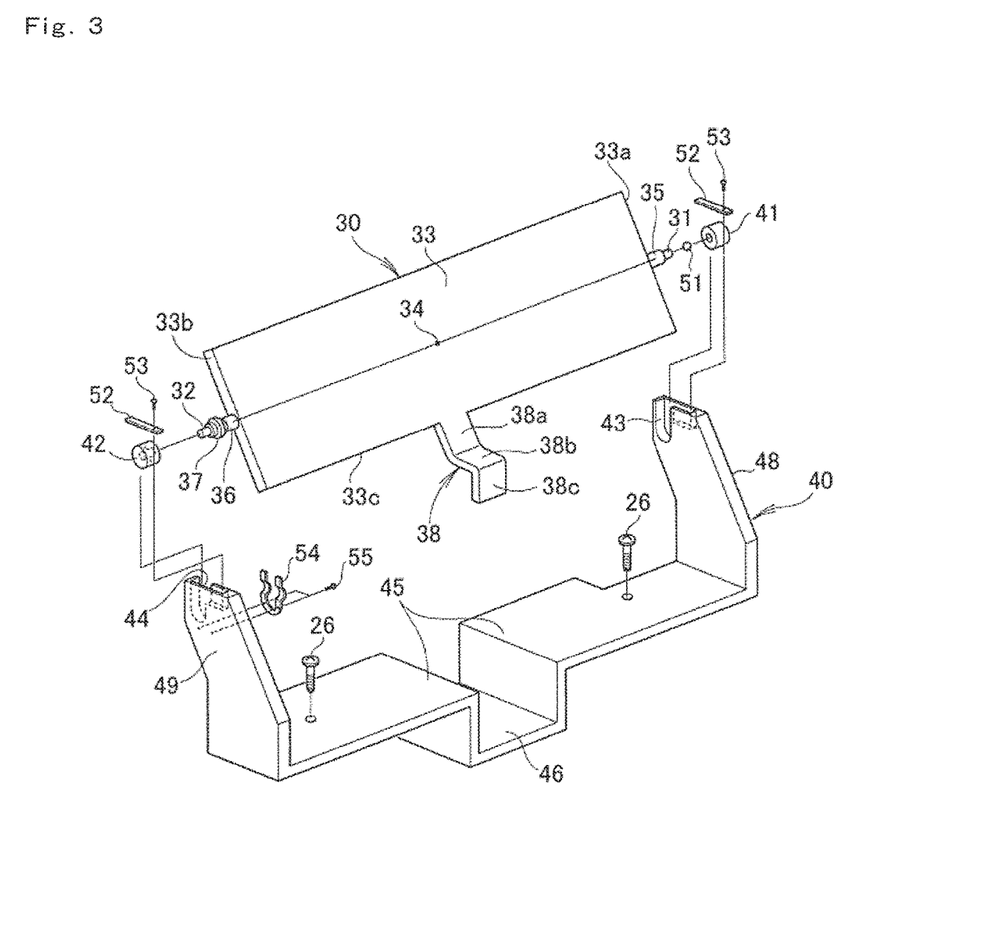
FIG. 3 is a perspective view of a mirror holder and a stay.

As shown in FIG. 3, the mirror holder 30 comprises a horizontally elongated rectangular concave mirror support portion 33, a first neck portion 35 projecting rightward from the right side 33 *a* of the concave mirror support portion 33 along the rotation axis 34, a first shaft portion 31 projecting further to the right from the neck part 35 and having a diameter smaller than that of the first neck part 35, a second neck part 36 projecting leftward from the left side 33 *b* of the concave mirror support part 33 along the rotation axis 34, a flange portion 37 integrally formed with the neck portion 36 and having a diameter larger than that of the second neck portion 36, a second shaft portion 32 projecting further to the left from the flange portion 37 and having the same diameter as the first shaft portion 31, and a protruding piece 38 protruding downward from the lower side 33 *c* of the concave mirror support 33 at a middle (approximately central) position of the holder width determined by the length from the left side 33 *b* to the right side 33 *a*.

The protruding piece 38 comprises a first extending portion 38 *a* extending from the concave mirror support portion 33 in parallel to the concave mirror support portion 33, a second extending portion 38 *b* extending substantially horizontally from the first extending portion 38*a*, and a third extending portion 38 *c* extending downward from the tip of the second extending portion 38 *b*. The third extension portion 38 *c* faces substantially vertically in the use state. That is, in order to make the third extending portion 38 *c* vertical, the oblique first extending portion 38 *a* and the substantially horizontal second extending portion 38 *b* are interposed.

As the mirror holder 30, a resin molded product or a metal pressed product is preferable. Particularly, as long as it is an injection-molded product of resin, a complex shape can be obtained easily and inexpensively.

The stay 40 comprises a lower floor portion 46 at the center (including a substantially central portion), upper stage floor portions 45, 45 extending leftward and rightward from the lower stage floor portion 46, and a right side wall portion 48 and a left side wall portion 49 extending upward from both ends of the upper stage floor portions 45, 45.

As the stay 40, a resin molded product or a metal pressed product is preferable. In particular, as long as it is a pressed product of aluminum alloy, it is lightweight and rich in rigidity, so it is suitable as a support member for the mirror holder 30.

The first shaft portion 31 extending rightward from the concave mirror support portion 33 is inserted into the first tubular bearing 41 having the bottomed cylindrical shape via the steel ball 51. The first tubular bearing 41 is set on the first U-shaped recessed portion 43 provided on the right side wall portion 48 from above. Thereafter, the bearing retainer 52 is fixed to the right side wall portion 48 with screws 53. Thus, it is possible to prevent the first tubular bearing 41 from floating up and fix the first tubular bearing 41. Although the first tubular bearing 41 is cylindrical in this example, it may be a rectangular shape having a round hole. Rotation can be more easily prevented by the rectangular shape.

The second shaft portion 32 extending to the left from the concave mirror support portion 33 is inserted into the second tubular bearing 42 having a bottomed cylindrical shape. The second tubular bearing 42 is set on the second U-shaped recess 44 provided in the left side wall portion 49 from above. Thereafter, the bearing retainer 52 is fixed to the left side wall portion 49 with screws 53. Thus, it is possible to prevent the second tubular bearing 42 from floating up and fix the second tubular bearing 42. The steel ball 51 is not used on the left side. Instead, a biasing member 54 is interposed between the flange portion 37 and the left side wall portion 49. Although the second tubular bearing 42 is also cylindrical in this example, it may be a rectangular shape having a round hole.

Figure 4:
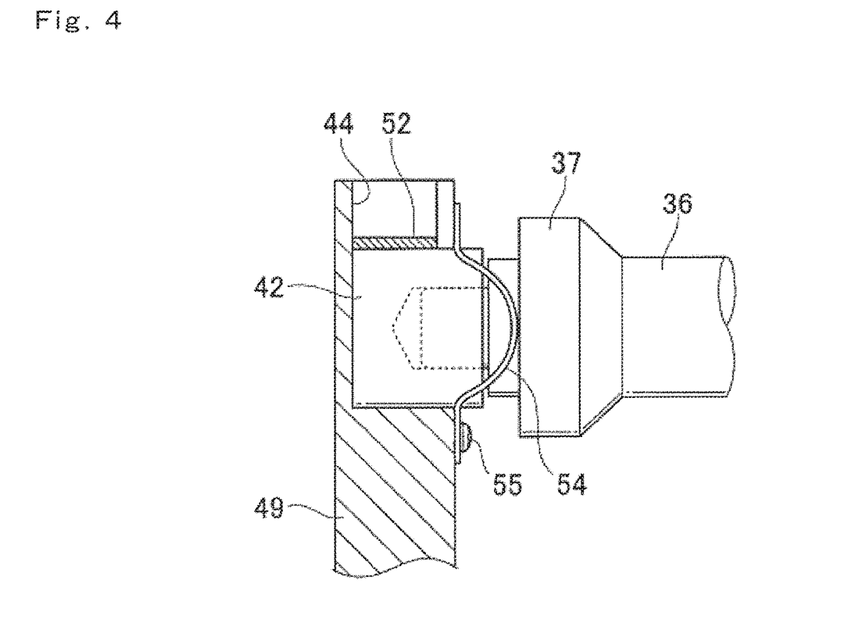
FIG. 4 is a view showing an attachment configuration of a biasing member.

That is, as shown in FIG. 4, the biasing member 54 pushes the flange portion 37 with the left side wall portion 49 as a starting point. The biasing member 54 can be fixed in any desired manner, for example, by screws 55 to the left side wall 49. As the biasing member 54, a leaf spring is inexpensive and suitable, but it may be a compression coil spring.

Figure 5:
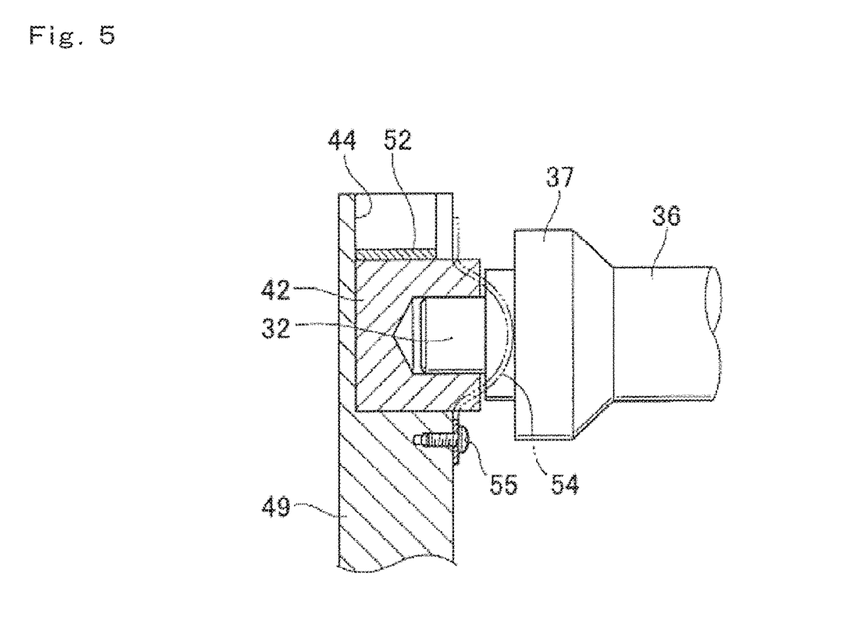
FIG. 5 is a cross-sectional view showing an attachment configuration of a second shaft portion and a second tubular bearing.

As shown in FIG. 5, the second tubular bearing 42 is a non-rotating member, and the second shaft portion 32 is a rotating member. The second tubular bearing 42 is a sliding bearing that rotatably supports the second shaft portion 32. The second tubular bearing 42 may be made of resin or metal, but a metallic bearing called metal is suitable from the viewpoint of durability.

Figure 6:
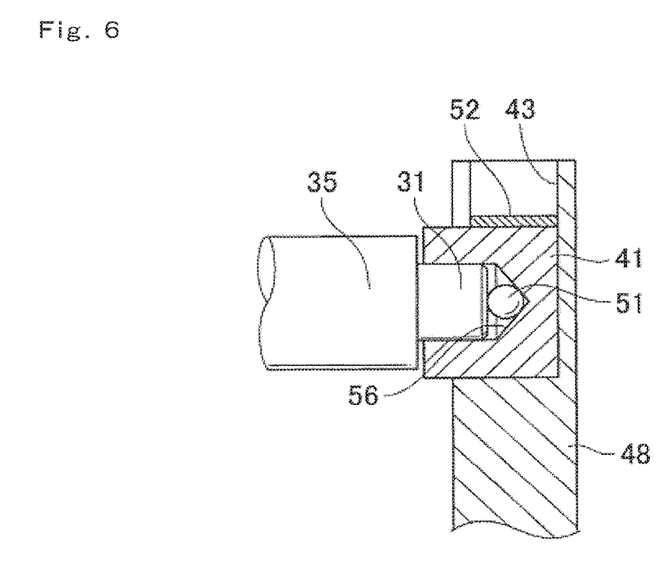
FIG. 6 is a cross-sectional view showing a mounting configuration of a steel ball, a first shaft portion, and a first tubular bearing.

As shown in FIG. 6, the first tubular bearing 41 has a concave portion 56 having a V-shaped cross section at the bottom. The steel ball 51 is placed in the concave portion 56, and the first shaft portion 31 is fitted to the first tubular bearing 41. The first tubular bearing 41 is also a non-rotating member, and the first shaft portion 31 is a rotating member. The first tubular bearing 41 is a sliding bearing which rotatably supports the first shaft portion 31. Although the first tubular bearing 41 may be made of resin or metal, a metallic bearing called metal is suitable from the viewpoint of durability.

Figure 7:
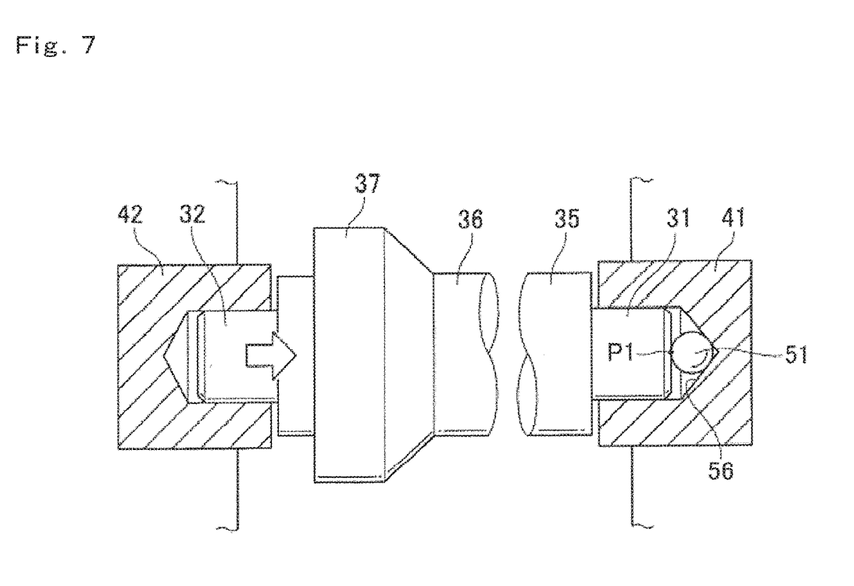
FIG. 7 is a view for explaining the action of a steel ball.

As shown in FIG. 7, since the flange portion 37 is biased toward the steel ball 51 side by the biasing member (reference numeral 54 in FIG. 4), the first shaft portion 31 is pressed toward the steel ball 51 formed of a metal member. At this time, since the first shaft portion 31 and the steel ball 51 are in contact with each other at one contact point P 1, the contact area between the first shaft portion 31 and the steel ball 51 becomes extremely small. As a result, abrasion of the first shaft portion 31, which is brought into contact with the steel ball 51 formed of the metal member at one contact point P 1, is suppressed, and the durability of the first shaft portion 31 can be improved.

The action of the steel ball 51 can also be explained from another aspect.

The distance between the first shaft portion 31 and the second shaft portion 32 is slightly changed due to thermal expansion and contraction accompanying a temperature change. In consideration of thermal expansion, a slight gap is set between the first shaft portion 31 and the first tubular bearing 41 and between the second shaft portion 32 and the second tubular bearing 42. This gap maintains smooth tilting of the mirror holder 30.

In the absence of the steel ball 51, there is a possibility that the mirror holder 30 shown in FIG. 3 slightly swings (reciprocates in the axial direction) in the direction along the rotation axis 34 during angle adjustment. Since this swing induces sway of the image (display image 19), it is required to restrict the movement.

In the present invention, the steel ball 51 and the biasing member 54 are provided. When the distance between the first shaft portion 31 and the second shaft portion 32 decreases, the biasing member 54 is in an extended state and presses the first shaft portion 31 against the steel ball 51. When the distance between the first shaft portion 31 and the second shaft portion 32 increases, the biasing member 54 is in a contracted state and presses the first shaft portion 31 against the steel ball 51. This makes it possible to suppress sway in the direction along the rotation axis 34. As a result, it is possible to stably adjust the angle of the mirror holder 30, and it is possible to prevent sway of the image (display image 19).

Next, the detailed structure of the position adjusting means 60 will be described.

Figure 8:
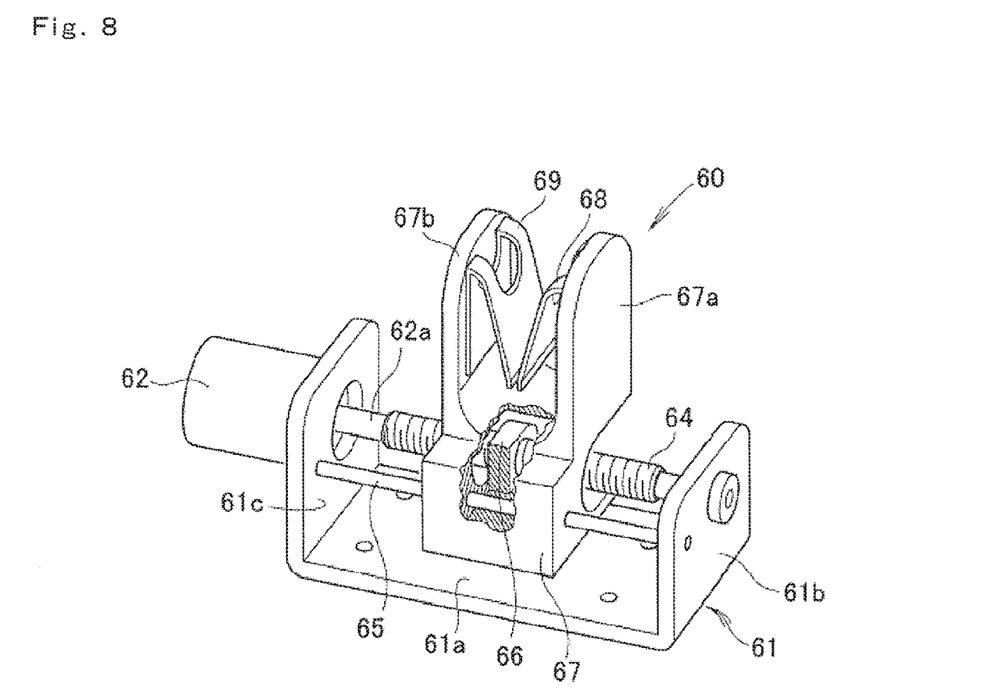
FIG. 8 is a perspective view of the position adjusting means.

As shown in FIG. 8, the position adjusting means 60 comprises a bottom 61 *a*, a bracket 61 comprising a front wall 61 *b* extending upward from one end of the bottom 61 *a* and a rear wall 61 *c* extending upward from the other end of the bottom 61 *a*, a stepping motor 62 attached to the rear wall 61 *c*, a feed screw (also referred to as a lead screw) 64 connected to a motor shaft 62 *a* extending through the rear wall 61 *c* toward the front wall 61 *b* and having its front end rotatably supported by the front wall 61 *b*, a guide rod 65 extending parallel to the feed screw 64 and supported by the front wall 61 *b* and the rear wall 61 *c*, a nut 66 screwed into the feed screw 64, a moving member 67 supported by the nut 66 and having first and second walls 67 *a* and 67 *b*, a first leaf spring 68 attached to the surface of the first wall 67*a* on the side of the second wall 67 *b*, and a second leaf spring 69 attached to the surface of the second wall 67 *b* on the side of the first wall 67 *a*.

The stepping motor 62 is a means for accurately rotating the feed screw 64, and can be changed to a rotary type actuator such as a servo motor.

The guide rod 65 is a non-rotating member and a non-moving member penetrating the moving member 67. When the feed screw 64 is rotated by the stepping motor 62, the non-rotating nut 66 moves, and the moving member 67 linearly moves together with the nut 66.

Figure 9:
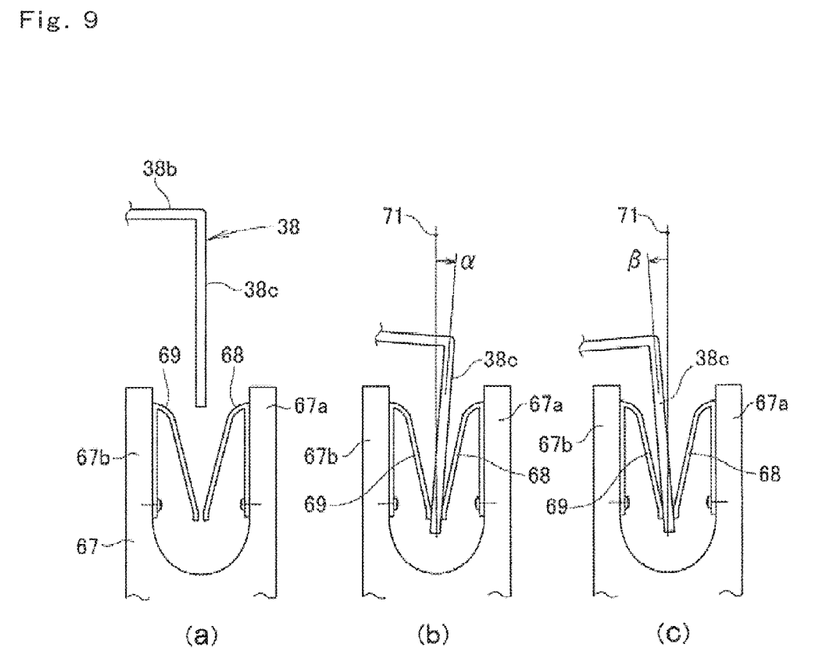
FIG. 9 is an operation diagram of the first and second leaf springs.

As shown in FIG. 9(*a*), the third extending portion 38 *c* of the protruding piece 38 is inserted between the first leaf spring 68 and the second leaf spring 69. By this insertion, the first and second leaf springs 68, 69 are elastically deformed.

As shown in FIG. 9(*b*), when the third extending portion 38 *c* is inclined by a clockwise with respect to the vertical line 71, the first leaf spring 68 expands and the second leaf spring 69 contracts. Even at this time, the first and second leaf springs 68, 69 never separate from the third extending portion 38 *c*.

As shown in FIG. 9(*c*), when the third extending portion 38 *c* is inclined by β counterclockwise with respect to the vertical line 71, the first leaf spring 68 contracts and the second leaf spring 69 expands. Even at this time, the first and second leaf springs 68, 69 never separate from the third extending portion 38 *c*.

As a result, in FIG. 1, the mirror holder 30 and the concave mirror 15 tilt smoothly without rattling.

When the third extending portion 38 *c* tilts from the angle α to the angle β, the third extending portion 38 *c* also moves up and down as a part of arc movement. In the case of the leaf springs 68, 69, there is also an advantage that the third extending portion 38 *c* slides (slips) in the vertical direction with respect to the plate springs 68, 69, so that the arc movement is not hindered.

Next, the position of the protruding piece 38 will be discussed.

In FIG. 3, it is assumed that the protruding piece 38 is abolished and the second shaft portion 32 is rotated by a rotating means. Since the hole diameter of the first tubular bearing 41 and the shaft diameter of the first shaft portion 31 are similar to each other, the fitting (mating) may become hard due to manufacturing errors or the like. In this state, when the second shaft portion 32 is rotated, there is concern that the stress concentrates in the vicinity of the second neck portion 36 of the concave mirror support portion 33. That is, the concave mirror support portion 33 may be locally deformed, and distortion of the display image may occur.

In this respect, if the protruding piece 38 is provided substantially at the center as in the present invention and the mirror holder 30 is tilted via this protruding piece 38, the stress concentration is eliminated, the distortion of the display image is greatly reduced.

Further, the position of the protruding piece 38 can be explained by the magnitude of the twist angle.

In FIG. 3, if the second shaft portion 32 is rotated while suppressing the first shaft portion 31, the mirror holder 30 substantially rotates around the rotation shaft 34, and torsional deformation occurs. The amount of this deformation increases in proportion to the distance from the first shaft portion 31. Then, in the vicinity of the second neck portion 36, the torsional amount of the concave mirror support portion 33 increases, and the distortion of the display image becomes conspicuous.

In this regard, if a couple (moment) is applied to the substantial center of the mirror holder 30 as in the present invention, the distance from the protruding piece 38 to the first shaft portion 31 and the distance from the protruding piece 38 to the second shaft portion 32 become half of the length along the rotation axis 34 of the mirror holder 30. Since the distance is halved, in the vicinity of the first and second neck portions 35, 36, the amount of torsion of the concave mirror support portion 33 is reduced by half, and the distortion of the display image is greatly reduced as a result. In addition, even if the distortion occurs, the display image is equally distorted to the left and right. The display image according to the present invention has an advantage that the distortion becomes inconspicuous as compared with the case where the display image is locally distorted in the vicinity of the second neck portion 36 unlike the conventional technique.

When the distance from the right side 33 *a* of the concave mirror support 33 to the protruding piece 38 is called a right distance and the distance from the left side 33 *b* of the concave mirror support 33 to the protruding piece 38 is called a left distance, the right distance and the left distance are desired to be equal. However, even if the right distance and the left distance are almost equal, the same action and effect are exhibited. Therefore, the ratio between the right distance and the left distance is set in the range of 0.8 to 1.2, preferably 0.95 to 1.05.

In this way, by providing the protruding piece 38 at substantially the center of the holder width of the mirror holder 30 (the concave mirror support portion 33), it is possible to Obtain the desired action and effect.

Although a plane mirror is provided in the embodiment, the plane mirror may be eliminated, and display light from the display unit may be directly irradiated to the concave mirror.

Further, in the embodiment, the example in which the display light 16 emitted from the display unit 12 is irradiated on the windshield (windscreen) 17 has been described, but the display light 16 may be irradiated on a dedicated reflector different from the windshield 17.

In addition, the head-up display device 10 of the present invention can be mounted on vehicles traveling on land, ship, and aircraft.

INDUSTRIAL APPLICABILITY

The present invention is suitable for a head-up display device incorporating a concave mirror.

DESCRIPTION OF REFERENCE NUMERALS

10 Head-up display device
11 Housing
12 Display unit
15 Reflection mirror (concave mirror)
16 Display light
17 Projection member (windshield)
18 Driver
19 Display image
30 Mirror holder
31 First shaft portion
32 Second shaft portion
33 Concave mirror support portion
34 Rotation axis
38 Protruding piece
40 Mounting member (stay)
41 First tubular bearing
42 Second tubular bearing
51 Steel ball
54 Biasing member
56 Concave portion having a V-shaped cross section
60 Position adjusting means
62 Stepping motor
64 Feed screw
67 Moving member
67 *a* First wall
67 *b* Second wall
68 First leaf spring
69 Second leaf spring

The invention claimed is:

1. A head-up display device, comprising a housing, a reflection mirror housed in the housing and reflecting display light from a display unit, a mirror holder housed in the housing and rotatably mounted on the housing for supporting the reflection mirror, a position adjusting means housed in the housing and adjusting the position of the mirror holder to adjust the angle of the reflection mirror, wherein
    the reflection mirror reflects the display light toward a projection member to project a display image onto a projection member for allowing a driver to visually recognize the display image,
    the mirror holder has an edge extending along a rotation axis, and a protruding piece protruding from substantially a center of the edge, and
    the position adjusting means moves the protruding piece to adjust the position of the mirror holder.

2. A head-up display device, comprising a housing, a reflection mirror housed in the housing and reflecting display light from a display unit, a mirror holder housed in the housing and rotatably mounted on the housing for supporting the reflection mirror, a position adjusting means housed in the housing and adjusting the position of the mirror holder to adjust the angle of the reflection mirror, wherein
    the reflection mirror reflects the display light toward a projection member to project a display image onto a projection member for allowing a driver to visually recognize the display image,
    the mirror holder comprises a protruding piece protruding from substantially the center of a holder width defined along a rotation axis, and the protruding piece is moved by the position adjusting means,
    the mirror holder is supported by the housing via a mounting member,
    a first shaft portion and a second shaft portion are respectively extended from both ends of the mirror holder along the rotation axis,
    a first tubular bearing for rotatably supporting the first shaft portion and a second tubular bearing for rotatably supporting the second shaft portion are provided on the mounting member,
    a concave portion having a V-shaped cross section is formed at the bottom of the first tubular bearing,
    a steel ball is placed in the concave portion,
    a biasing member for biasing the second shaft portion toward the steel ball side is placed between the second tubular bearing and the second shaft portion, and
    in a direction along the rotation axis, the steel ball butts to the first tubular bearing, and the first shaft portion butts to the steel ball.

3. The head-up display device according to claim 1, wherein:
    the position adjusting means comprises
        a feed screw extending in a direction perpendicular to the rotation axis,
        a stepping motor for turning the feed screw, and
        a moving member including a first wall and a second wall which are sent by the feed screw to sandwich the protruding piece,
    a first leaf spring is interposed between the first wall and the protruding piece, a second leaf spring is interposed between the second wall and the protruding piece, and
    the protruding piece is always biased with the first and second leaf springs.

4. A head-up display device, comprising a housing, a reflection mirror housed in the housing and reflecting display light from a display unit, a mirror holder housed in the housing and rotatably mounted on the housing for supporting the reflection mirror, a position adjusting means housed in the housing and adjusting the position of the mirror holder to adjust the angle of the reflection mirror, wherein
    the reflection mirror reflects the display light toward a projection member to project a display image onto a projection member for allowing a driver to visually recognize the display image,
    the mirror holder comprises a protruding piece protruding from substantially the center of a holder width defined along a rotation axis, and the protruding piece is moved by the position adjusting means, the position adjusting means comprises:
  a feed screw extending in a direction perpendicular to the rotation axis,
  a stepping motor for turning the feed screw, and
  a moving member including a first wall and a second wall which are sent by the feed screw to sandwich the protruding piece,
a first leaf spring is interposed between the first wall and the protruding piece, a second leaf spring is interposed between the second wall and the protruding piece, and
the protruding piece is always biased with the first and second leaf springs.

\* \* \* \* \*